United States Patent
Auchoybur et al.

(10) Patent No.: US 10,495,095 B2
(45) Date of Patent: Dec. 3, 2019

(54) MULTISTAGE COMPRESSOR WITH AEROFOIL PORTION PROFILED IN A SPANWISE DIRECTION

(71) Applicant: ROLLS-ROYCE plc, London (GB)

(72) Inventors: Kiran S Auchoybur, Cambridge (GB); Robert J Miller, Cambridge (GB); Christopher R Hall, Derby (GB); Anthony J Rae, Derby (GB)

(73) Assignee: ROLLS-ROYCE PLC, London (GB)

( * ) Notice: Subject to any disclaimer, the term of this patent is extended or adjusted under 35 U.S.C. 154(b) by 421 days.

(21) Appl. No.: 15/335,765

(22) Filed: Oct. 27, 2016

(65) Prior Publication Data
US 2017/0138364 A1   May 18, 2017

(30) Foreign Application Priority Data
Nov. 12, 2015 (GB) .................................. 1519946.6

(51) Int. Cl.
F04D 19/02 (2006.01)
F01D 5/14 (2006.01)
(Continued)

(52) U.S. Cl.
CPC ............. *F04D 19/02* (2013.01); *F01D 5/141* (2013.01); *F04D 29/321* (2013.01);
(Continued)

(58) Field of Classification Search
CPC ...................................................... F01D 5/141
See application file for complete search history.

(56) References Cited

U.S. PATENT DOCUMENTS 2,801,790 A    8/1957  Doll, Jr.
6,299,412 B1*  10/2001 Wood .................. F01D 5/141
                                              416/223 A
(Continued)

FOREIGN PATENT DOCUMENTS

EP    1 098 092 A2    5/2001
EP    1 106 836 A2    6/2001
(Continued)

OTHER PUBLICATIONS

Mar. 20, 2017 Extended Search Report issued in European Patent Application No. 16195435.9.
(Continued)

*Primary Examiner* — Igor Kershteyn
*Assistant Examiner* — John S Hunter, Jr.
(74) *Attorney, Agent, or Firm* — Oliff PLC

(57) ABSTRACT

A multistage compressor for a gas turbine engine is disclosed. The compressor includes a plurality of compressor stages, each stage including in axial flow series a row of rotor blades and a row of stator vanes; a hub to which a radially inner end of each rotor blade of the rows of rotor blades is connected; and a casing that circumscribes the rows of rotor blades and the rows of stator vanes. An aerofoil portion of each of the rotor blades and/or the stator vanes of one or more of the plurality of compressor stages is profiled in a spanwise direction such that the aerofoil portion has a trailing edge that is angled more towards an axial direction of the multistage compressor in regions of the aerofoil portion proximal to the casing and the hub than in a mid-region of the aerofoil portion.

10 Claims, 5 Drawing Sheets

(51) Int. Cl.
  *F04D 29/32* (2006.01)
  *F04D 29/54* (2006.01)
  *F04D 29/52* (2006.01)

(52) U.S. Cl.
  CPC ......... *F04D 29/324* (2013.01); *F04D 29/522* (2013.01); *F04D 29/542* (2013.01); *F04D 29/544* (2013.01); *F05D 2240/122* (2013.01); *F05D 2240/304* (2013.01); *F05D 2250/38* (2013.01); *F05D 2250/70* (2013.01)

(56) References Cited

U.S. PATENT DOCUMENTS

| | | | | |
|---|---|---|---|---|
| 6,312,219 | B1 * | 11/2001 | Wood | F01D 5/005 415/191 |
| 6,331,100 | B1 * | 12/2001 | Liu | F01D 5/141 416/223 A |
| 6,508,630 | B2 * | 1/2003 | Liu | F01D 5/145 416/228 |
| 8,684,698 | B2 * | 4/2014 | Breeze-Stringfellow | F01D 5/141 416/223 A |
| 8,702,398 | B2 * | 4/2014 | Breeze-Stringfellow | F01D 5/141 416/242 |
| 9,074,483 | B2 * | 7/2015 | Breeze-Stringfellow | F01D 5/141 |
| 2002/0141863 | A1 | 10/2002 | Liu et al. | |
| 2012/0243983 | A1 | 9/2012 | Breeze-Stringfellow et al. | |
| 2012/0244005 | A1 | 9/2012 | Breeze-Stringfellow et al. | |

FOREIGN PATENT DOCUMENTS

| | | |
|---|---|---|
| EP | 1 422 382 A1 | 5/2004 |
| EP | 1 505 302 A1 | 2/2005 |
| EP | 2 133 573 A1 | 12/2009 |

OTHER PUBLICATIONS

Mar. 10, 2016 Search Report issued in British Patent Application No. 1519946.6.

* cited by examiner

MULTISTAGE COMPRESSOR WITH AEROFOIL PORTION PROFILED IN A SPANWISE DIRECTION

TECHNICAL FIELD

The present disclosure concerns a compressor and/or a gas turbine engine.

BACKGROUND

Gas turbine engines are typically employed to power aircraft. Typically a gas turbine engine will comprise an axial fan driven by an engine core. The engine core is generally made up of one or more turbines which drive respective compressors via coaxial shafts. The fan is usually driven off an additional lower pressure turbine in the engine core.

A compressor typically comprises a series of rotatable components. The rotatable components each comprise an array of blades, each having an aerofoil cross section. The blades are attached to a central hub or drum. The blades of the rotatable components accelerate the air through the engine. Each of the rotatable components are coupled with a static component which comprises an array of vanes that are also of aerofoil cross section. The static components are connected to radially inner and/or outer casing components. Conventionally, the surface of the hub and the casing components that define the main gas flow path through the compressor are referred to as endwalls.

Compressors are designed to avoid or limit stall. Stall is a disruption of airflow through the compressor that can result in a momentary power drop or in the worst case a complete loss of compression. It is desirable to increase the range at which the compressor can operate before experiencing stall (the stall margin).

Near the endwalls of blade rows in a multi-stage compressor, a spanwise region of low axial momentum flow develops. This region of low axial momentum flow leads to two flow regimes: that of the endwall region and that of the free-stream. The endwall region is influenced by the presence of the hub and casing components, clearance flows, and corner separations, and has a high degree of three dimensional flow. The free-stream can be treated as a flow region unaffected by endwall effects. The extent of the endwall and freestream regimes vary depending on aerodynamic loading. The further off-design (i.e. the closer to stall), the larger the three dimensional flow regime becomes.

Conventionally, gas turbine engine compressor designers have attempted to increase the stall margin by delaying the rise in endwall loss. A common way to increase stall margin is to reduce the pitch-to-chord ratio of the blade row, which can be achieved by either increasing blade count and/or increasing the chord. Having a smaller pitch-to-chord delays the growth of the corner separation. The number of blades and chord is therefore strongly linked to the stall margin requirement.

However, the number of blades required for sufficient stall margin is often greater than the optimal number for best design point efficiency. As such, designers attempt to delay the growth of the corner separation by means other than increasing blade count or chord. Typically, the stall margin can be increased by delaying the growth in corner separation by leaning blades and/or vanes and changing the sweep of the blades and/or vanes. Attempts have also been made to increase the stall margin by de-cambering blades (i.e. reducing the curvature of the blades) in a region near to the hub and casing component.

SUMMARY

The inventors have found that de-cambering the blades in the region of the endwalls only helps a single blade row in the multi-stage environment. As such, it is expected that down-stream stages would suffer in the endwall region as de-cambering reduces the flow rate through the endwall region for the downstream stage, resulting in a higher endwall static pressure rise coefficient.

In preparation for filing the present patent application, the inventors conducted a search and found U.S. Pat. No. 2,801,790. U.S. Pat. No. 2,801,790 relates to changing the exit angle of flow exiting an inlet guide vane (that is a guide vane that guides air into the compressor). However, U.S. Pat. No. 2,801,790 does not relate to manipulating flow in a multistage environment, nor does it provide any teaching of how to do this. In particular, there is no teaching in U.S. Pat. No. 2,801,790 of how to reduce the static pressure rise coefficient in the endwall region to increase the endwall stability margin, as achieved by the compressor of the present disclosure.

According to a first aspect there is provided a multistage compressor for a gas turbine engine, the compressor comprising a plurality of compressor stages, each compressor stage comprising in axial flow series a row of rotor blades and a row of stator vanes. A radially inner end of the rotor blades are connected to a hub. A casing circumscribes the rotor blades and the stator vanes. The rotor blades and the stator vanes each have an aerofoil portion. Each of the aerofoil portions of the rotor blades and/or the stator vanes of one or more stages of the compressor are profiled in a spanwise direction such that the aerofoil portion has a trailing edge that is angled more towards the axial direction in a region proximal to the casing and in a region proximal to the hub than in a mid-region.

The mid-region of the aerofoil is a region between the region that is proximal to the hub and the region that is proximal to the casing.

The respective blade or vane may be considered to have a reduced stagger angle in a region proximal to the hub and in a region proximal to the casing than compared to in a mid-region. The stagger angle is the angle between the axial direction and a chord that extends from the trailing edge to the leading edge of the aerofoil.

In the present application, a camber line is the midposition between a pressure surface and a suction surface of a rotor blade or a stator vane. The angle of the leading edge is measured from a tangent to the camber line at the leading edge, and the angle at the trailing edge is measured from a tangent to the camber line at the trailing edge.

The angle between the axial direction of the compressor and the trailing edge of the respective aerofoil portion may increase gradually from a position proximal to the hub or casing to the mid-region.

The angle of the trailing edge in the mid-region may be constant.

The angle of the trailing edge (with reference to the axial direction) in the region of the endwalls may be reduced compared to the angle in the mid-region by an extent such that there is a surplus of axial momentum in the region of the endwalls in the air flowing past the stator vanes and/or rotor blades when the compressor is operating at the design point.

The mid-region may have a spanwise extent equal to or between 30 and 70% of the span of the blade, e.g. equal to or above 40%, equal to or below 60%, or equal to, below or above 50%.

The trailing edge may be angled such that the difference in flow exit angle between the mid-region and the regions proximal to the hub and the casing is equal to or between 0.5 and 8 degrees, for example equal to or between 2 and 4 degrees.

The exit angle may be different near the hub than near the casing. The exit angle may be different for the rotor blade compared to the stator vane.

The angle of the leading edge of the respective blade or stator may remain substantially constant in a spanwise direction.

The one or more stages of the compressors having the profiled aerofoil portions may be positioned downstream of a second stage of the compressor. For example, every compressor stage positioned downstream of the second stage may include profiled aerofoil portions.

According to a second aspect there is provided a gas turbine engine comprising a compressor according to the first aspect.

The compressor may be the intermediate-compressor and/or the high pressure compressor.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

The following conventional definitions are used in the present disclosure:

The flow coefficient is the ratio of the axial velocity of the flow to the mid-height blade speed.

The pressure loss coefficient is $$\frac{(P_{01} - P_{02})}{(P_{01} - P_1)},$$

where $P_{01}$ is the stagnation pressure at the inlet, $P_{02}$ is the stagnation pressure at the outlet, and $P_1$ is the pressure at the inlet.

Figure 1:
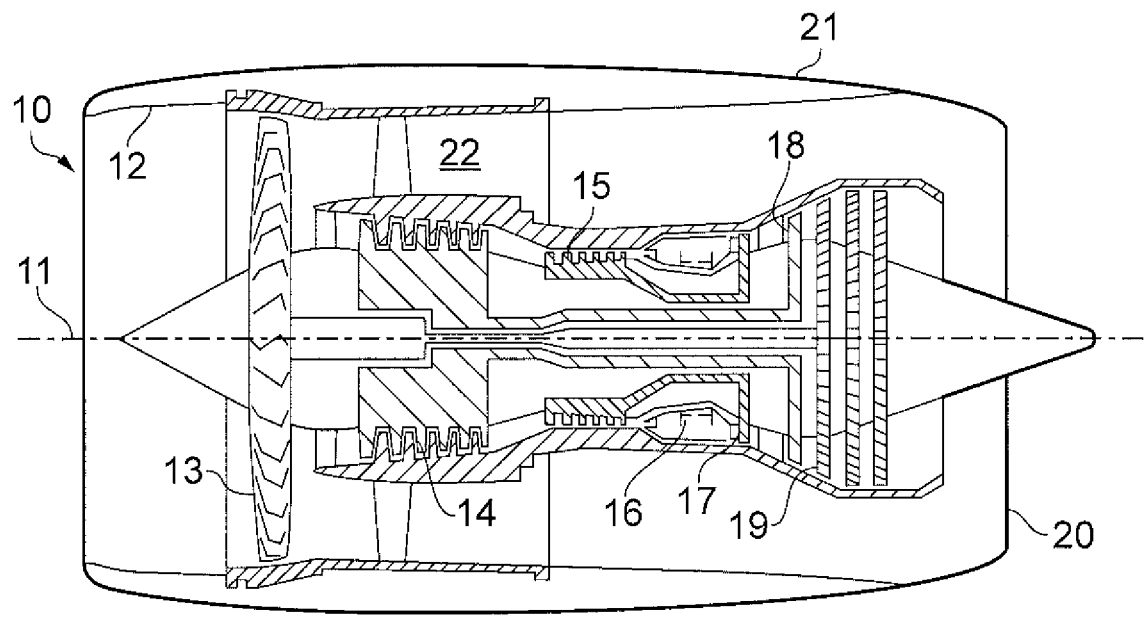
FIG. 1 is a sectional side view of a gas turbine engine.

The static pressure rise coefficient is $$\frac{\Delta p}{0.5 \rho V^2},$$

where $\Delta p$ is the difference in static pressure from the inlet to exit of the blade row. This is normally taken along a streamline from inlet to exit. V is the relative velocity vector magnitude. V is the magnitude of the inlet velocity vector in the frame of reference relative to the blade row. For example, for the rotor, the velocity vector in the rotating frame of reference would be used. $\rho$ is the density of the air flowing through the compressor in the freestream With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

In the present disclosure, reference to upstream and downstream refers to the direction of the axial flow of air through the gas turbine engine.

Figure 2:
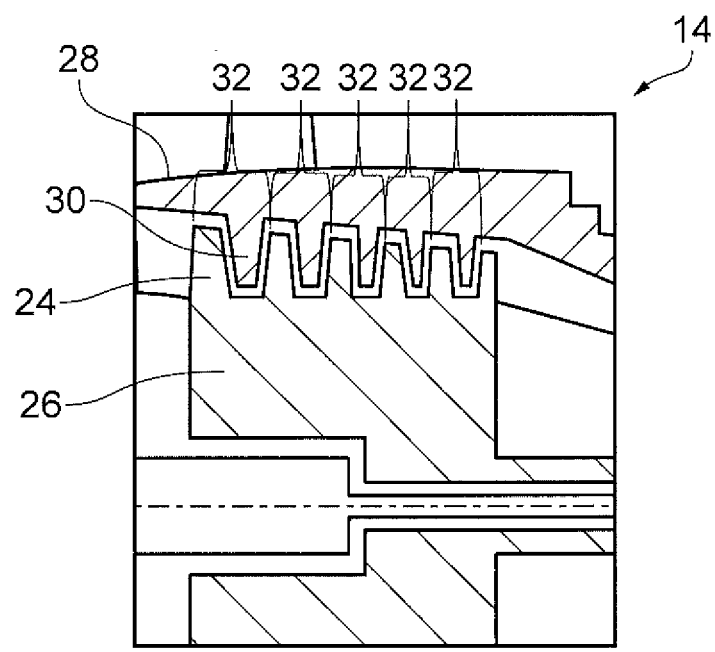
FIG. 2 is a sectional side view of a portion of the intermediate pressure compressor of FIG. 1.

Referring now to FIG. 2, the compressor 14 is a multi-stage compressor and includes a plurality of rotor assemblies each defining a row of rotor blades 24 that extend from a hub 26 of the compressor. A casing 28 circumscribes the rotor blades. A plurality of stator assemblies each defining a row of stator vanes 30 extend radially inward from the casing. One row of stator vanes is arranged axially behind each row of rotor blades. Each row of rotor blades and adjacent downstream row of stator vanes define a stage 32 of the compressor. In the example shown in FIGS. 1 and 2, the intermediate pressure compressor 14 has five stages. However, in alternative embodiments the compressor may have more or may have fewer stages. The inner diameter of the casing (and the length of the blades and vanes) reduces in a downstream direction, such that the annulus through which air flows through the compressor reduces so as to substantially maintain the axial velocity of the airflow through the compressor.

Figure 3:
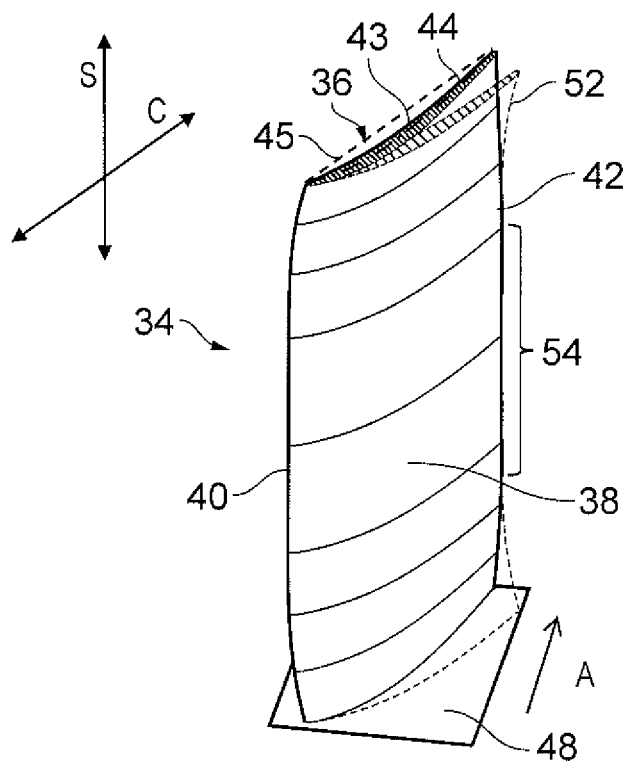
FIG. 3 is a perspective view of an aerofoil and endwall of a stator or a blade, the solid line indicates an aerofoil portion of the present disclosure and the dotted line indicates a conventional aerofoil.
Figure 4:
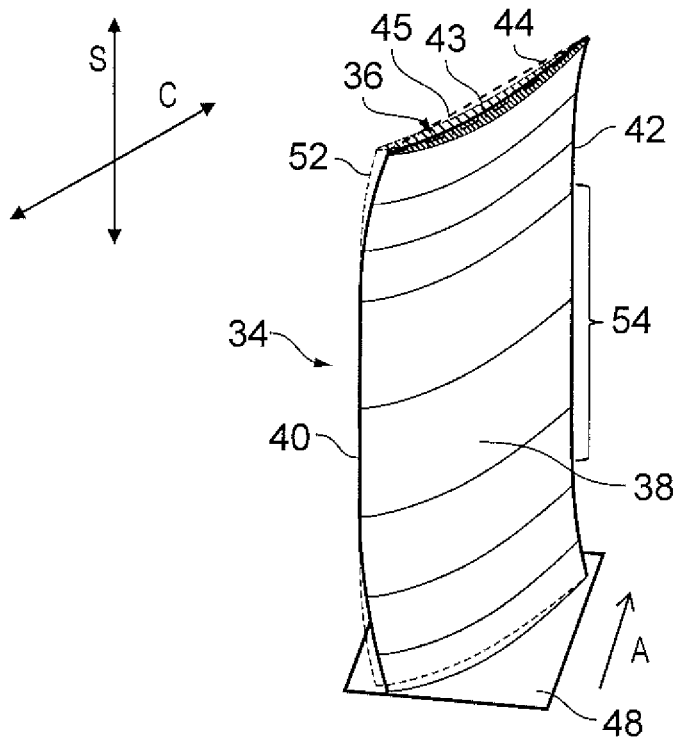
FIG. 4 is a perspective view of an alternative aerofoil and endwall of a stator or a blade, the solid line indicates an aerofoil portion of the present disclosure and the dotted line indicates a conventional aerofoil
Figure 5A:
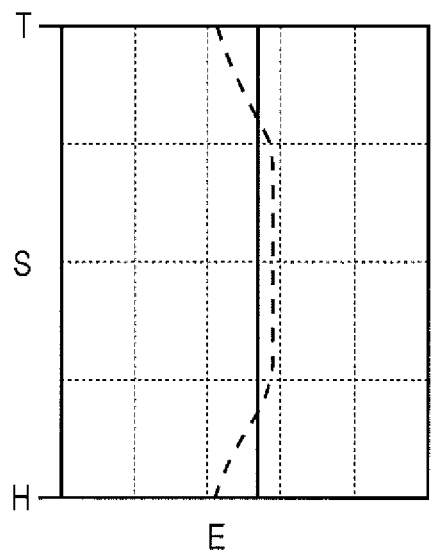
FIG. 5A is a plot of exit flow angle from an aerofoil against spanwise position for a rotor blade of an infinite radius compressor, with the solid line indicating an exit flow angle for a conventional blade and the dotted line indicating an exit flow angle for a blade of the present disclosure.
Figure 5B:
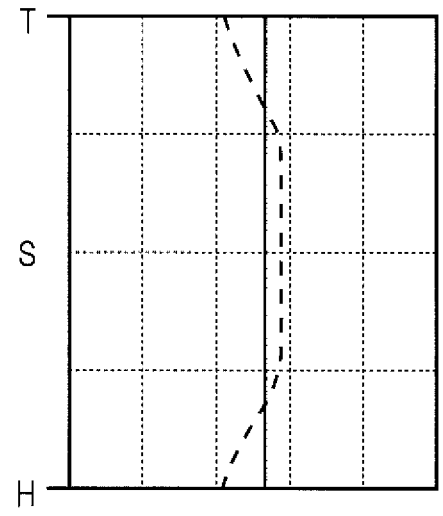
FIG. 5B is a plot of exit flow angle from an aerofoil against spanwise position for a stator vane of an infinite radius compressor, with the solid line indicating an exit flow angle for a conventional blade and the dotted line indicating an exit flow angle for a blade of the present disclosure.
Figure 6A:
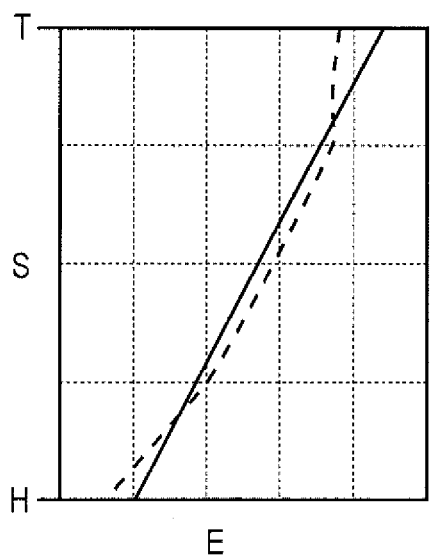
FIG. 6A is a plot of exit flow angle from an aerofoil against spanwise position for a rotor blade of a realistic radius compressor, with the solid line indicating an exit flow angle for a conventional blade and the dotted line indicating an exit flow angle for a blade of the present disclosure.
Figure 6B:
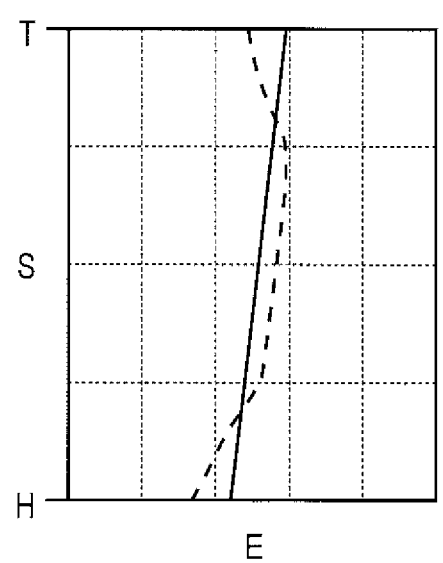
FIG. 6B is a plot of exit flow angle from an aerofoil against spanwise position for a stator vane of a realistic radius compressor, with the solid line indicating an exit flow angle for a conventional blade and the dotted line indicating an exit flow angle for a blade of the present disclosure.

Referring now to FIGS. 3 and 4, each rotor blade and stator vane has an aerofoil portion 34 that is positioned in the gas flow path. The aerofoil portion includes a pressure surface 36, a suction surface 38, a leading edge 40 and a trailing edge 42. The camber line 44 of the aerofoil portion is a line that is mid-way between the pressure surface and the suction surface. An endwall 48 of the stator vane and rotor blade is defined by the hub and the casing, such that each stator vane and rotor blade is associated with two endwalls (one defined by the hub and one defined by the casing). It will be understood by the person skilled in the art that the blades and vanes may be of a cantilever type and in such cases they will only be physically connected to one of the end walls.

In the present disclosure, a spanwise direction S refers to a direction extending between the tip 43 of the aerofoil and the connected end wall 48 (i.e. either the hub or the casing as applicable). The chordwise direction C extends between the leading edge and the trailing edge of the aerofoil. A chord of the aerofoil is the length between the leading edge and the trailing edge when a straight line is drawn between the two.

In the present example, all of the stages of the compressor downstream of the second stage of the compressor have blades and stators with a profile as shown in FIG. 3 or as shown in FIG. 4. As a comparison, the profile of the aerofoil portion of a conventional blade or vane is indicated by a dotted line 52. In the stages downstream of the second stage, the stages are considered as embedded repeating stages, that is, the incoming flow to one stage delivers higher pressure flow to the downstream stage, but the shape of the spanwise velocity profile is virtually unchanged.

Referring to FIGS. 3 and 4, the aerofoil portion 34 of the blades and/or vanes is profiled such that in a region proximal to the endwall at both the hub and the casing, the angle of the trailing edge 42 is altered, such that the trailing edge, in a region proximal to the end wall, appears to be pointing in a more axial direction A than otherwise would be the case for a set of conventional rotor blades and stators vanes. That is, it can be considered that the angle of the trailing edge to the axial direction is reduced, and/or that the exit angle is reduced. The angle of the leading edge 40 remains more or less unchanged, that is, the leading edge angle would be similar or the same as on a conventional blade or vane design for a given application.

The camber of a blade is the measurement of the amount of aerofoil curvature. Changing the angle of the trailing edge 42 in the region of the endwalls 48 means that the aerofoil has an increased curvature near to the endwalls compared to in a spanwise mid-region 54 of the trailing edge, as such the regions near the endwalls can be considered as being over-cambered compared to the conventional blades indicated by the dotted line 52 in FIGS. 3 and 4. Changing the angle of the trailing edge 42 in the region of the end walls 48 also means that the stagger angle in these regions is reduced. The stagger angle is the angle between a the axial direction and a chord 45 that extends directly between the leading edge and the trailing edge.

In both the examples of FIGS. 3 and 4, the angle of the leading edge 40 remains the same. The difference between FIGS. 3 and 4 is that the aerofoil portion 34 of the blade or vane of FIG. 3 maintains the leading edge stacking, whereas the aerofoil portion 34 of the blade or vane of FIG. 4 maintains trailing edge 42 stacking.

In both examples, there is a gradual change in angle of the trailing edge 42 from a position adjacent the endwalls 48, to the mid-region 54 of the aerofoil. In the mid-region of the aerofoil the angle of the trailing edge remains substantially constant. The mid-region extends for a distance of approximately 50% of the span of the aerofoil portion of the blades or rotors, but in alternative embodiments the extent of the mid-region may be altered to meet specific engine operating requirements.

The angle of the trailing edge can be selected such that there is a moderate reduction in angling of the trailing edge in the region of the endwalls, the moderate reduction being such that the static pressure rise coefficient near the endwalls is reduced.

However, in alternative embodiments the angle of the trailing edge in the region of the endwalls is further reduced (referred to from hereon in as reduced trailing edge angle aerofoil) such that there is a surplus of axial momentum in the air flowing past the blade or vane at the design point. The level of angling (and hence the amount of design point surplus flow in the endwall) may be set such that at the point of stall there is no clear axial momentum deficit between the region of the endwalls and the free-stream prior to stall. By having no axial momentum deficit near stall, a more uniform aerodynamic loading across the whole span of the blade is achieved, allowing the full range capability of each portion of the blade to be utilised.

Referring to FIGS. 5A, 5B, 6A and 6B, example exit angles E of flow from the reduced trailing edge angle rotor blade and stator vane in the spanwise direction of the present disclosure is shown. As will be appreciated by the person skilled in the art, in a region of an aerofoil portion having a region with reduced trailing edge angle the exit angle will also be reduced. In FIGS. 5A, 5B, 6A and 6B, H indicates the position of the hub and T indicates the position of the tip of the aerofoil. The angle of the trailing edge is substantially proportional to the exit flow angle: to calculate the trailing edge angle the blade or vane should have, the flow exit angle minus a deviation is taken, and the deviation can be assumed constant for each spanwise height.

In a reduced trailing edge angle aerofoil, the difference in exit flow angle between the mid-region and a position directly adjacent the endwall for an infinite radius compressor may be for example, between 1 and 5 degrees, e.g. between 2 and 4 degrees.

The angle of the trailing edge in a region proximal to the attached endwall (in this example, the hub for the blade and the casing for the vane) may be similar to that in the region near the tip of the aerofoil (in the example, near the casing for the blade and near the hub for the vane). Alternatively, the angle of the trailing edge in a spanwise direction along the aerofoil may be asymmetric. For example, the trailing edge may be angled more towards the axial direction in a region near the tip of the aerofoil than in a region near the attached endwall. The tips of the blades operate at a lower work coefficient than a region near the hub because of the higher blade speed relative to the hub. Reducing the exit angle by a greater extent in a region near the tip than a region near the hub can increase the axial velocity of the flow near the tip to a similar extent as near the hub. In further examples, the region of the trailing edge that has a reduced trailing edge angle may extend by a different spanwise extent in a region proximal to the tip compared to a region proximal to the attached endwall.

Figure 7:
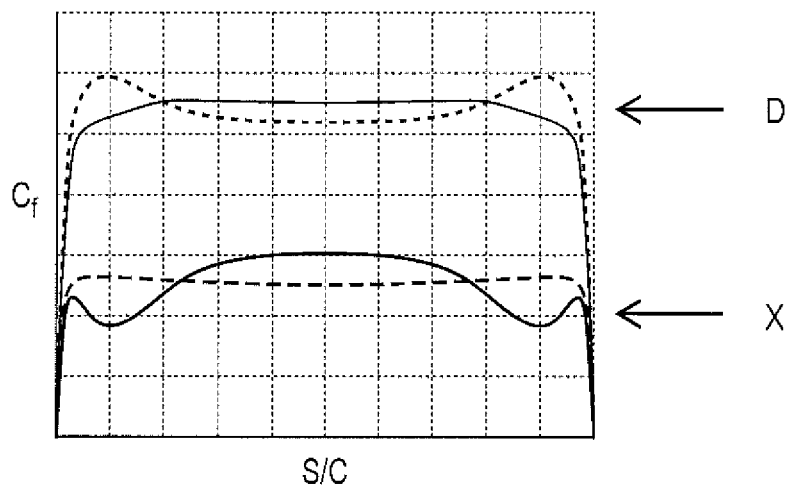
FIG. 7 is a plot of a ratio of spanwise position divided by the chord length at said spanwise position of an aerofoil against flow coefficient of an infinite radius compressor without any hub or tip clearances at the inlet of a stator vane for an operational point at design and off design.
Figure 8:
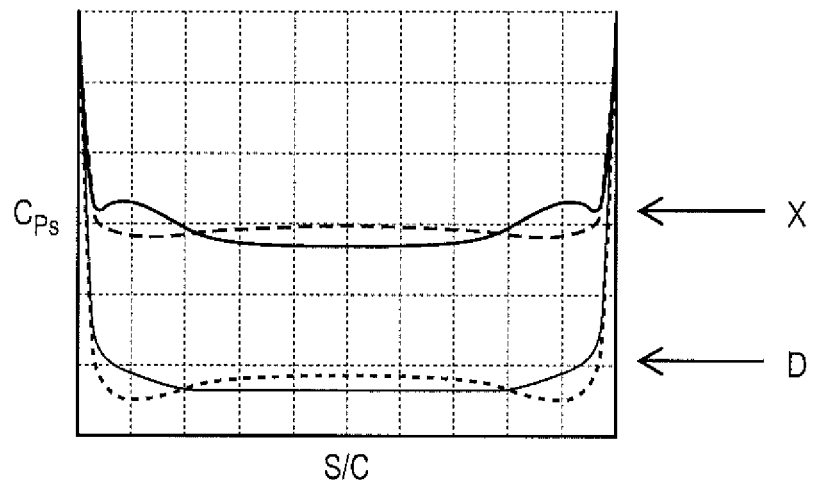
FIG. 8 is a plot of a ratio of spanwise position divided by the chord length at said spanwise position of an aerofoil against the static pressure rise coefficient of an infinite radius compressor without any hub or tip clearances at the inlet of a stator vane for an operational point at design and off design.
Figure 9:
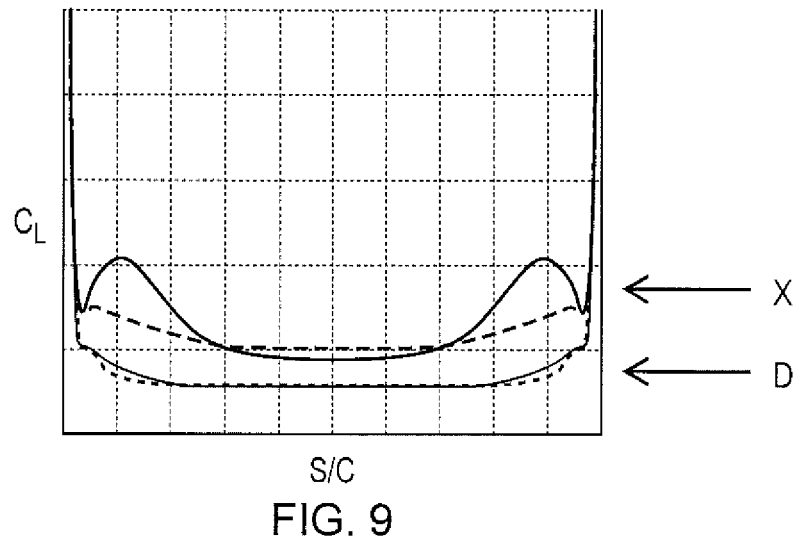
FIG. 9 is a plot of a ratio of spanwise position divided by the chord length at said spanwise position of an aerofoil against the loss coefficient of an infinite radius compressor without any hub or tip clearances at the inlet of a stator vane for an operational point at design and off design.

With reference to FIGS. 7 to 9, simulation results for a repeating stage compressor, having the rotor blades and stator vanes with a reduced trailing edge angle in the region of the endwalls, with an infinite radius and without any hub or tip clearances will now be described. Similar principles apply to realistic radius compressors, but the infinite radius compressor illustrates the principles more clearly. The plot at design point is indicated by an arrow D and the off design point plot is indicated by an arrow X.

Referring to FIG. 7, it can be seen that the profile of the flow coefficients $C_f$ at the stator inlet along the span of the reduced trailing edge angle aerofoil is more uniform than the conventional design when off-design. When operating at design point, as discussed previously, it can be seen that there is a surplus of axial momentum (which is substantially proportional to flow coefficient) in the region of the endwalls.

Referring to FIG. 8, it can be seen that when off-design, the aerofoil that has reduced trailing edge angle in a region of the endwall has a more uniform static pressure rise coefficient $C_{P_S}$ than the conventional design. Referring to FIG. 9, it can be seen that the rise in loss coefficient $C_L$ from design to off-design over the whole span of the aerofoil is more uniform for the aerofoil that has reduced trailing edge angle in the region of the endwall than for the conventional aerofoil, which is an indication that the mid-span and endwall region are approaching their diffusion limits together.

Figure 10:
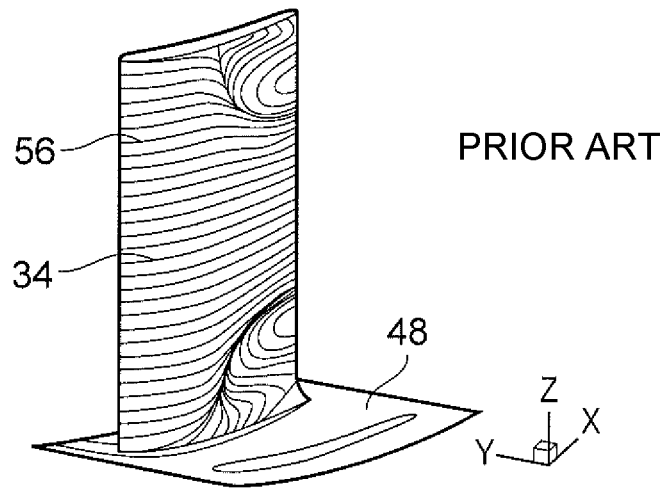
FIG. 10 shows a plot of surface streamlines for a conventional blade when operating off design.
Figure 11:
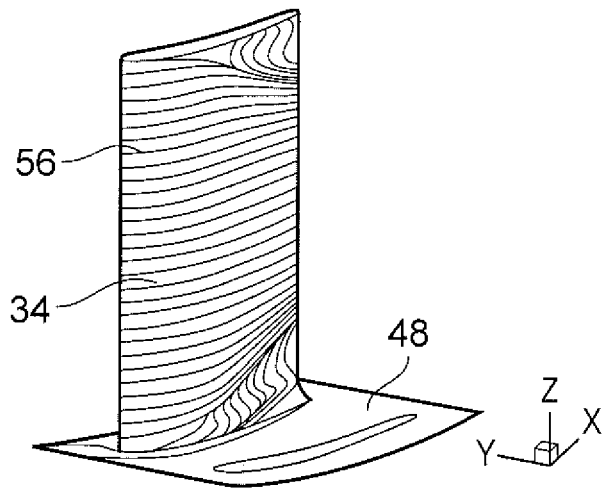
FIG. 11 shows a plot of surface streamlines for a blade of the present disclosure when operating at the same off design conditions as FIG. 10.
Figure 12:
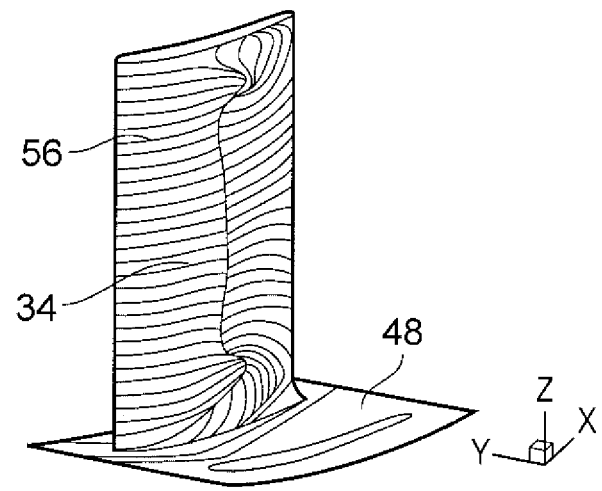
FIG. 12 shows a plot of surface streamlines for a blade of the present disclosure just prior to stall.

Referring to FIGS. 10 and 11, FIG. 10 is a plot of a 3D flow for a conventional aerofoil and FIG. 11 is a plot of a 3D flow for the aerofoil that has a reduced trailing edge angle in a region of the end walls, lines 56 indicate the streamlines (only one streamline is labelled for clarity). Comparing FIGS. 10 and 11, it can be seen that the cross-passage endwall boundary layer flow in the aerofoil that has reduced trailing edge angle in the region of the end walls has a smaller impact on the suction surface (i.e. there is less endwall boundary layer flow roll up onto the aerofoil suction surface), suggesting the flow near the endwall is in a healthier state than in the conventional design. FIG. 12 illustrates an example of flow behaviour before stall for the aerofoil that has reduced trailing edge angle in a region of the end walls. It is generally thought that multi-stage compressor stages stall from flow separation near either hub or casing endwall. However, when the described aerofoil portions of the blades and/or stators that have reduced trailing edge angle in a region of the end walls are used this is not necessarily the case because just prior to stall, all parts of the blade are close to stalling together (i.e. there is uniform spanwise flow separation).

Traditionally to increase endwall flow range in a compressor stage it has been thought that increasing the exit blade angle in the endwall region 'unloads' the endwall and improves the off-design range of the stage in question. However, the present inventors have found that in the multi-stage environment this is detrimental to downstream stages as flow is reduced in the endwall region as a result of this change. The described aerofoil that has reduced trailing edge angle in a region of the endwalls takes a different approach to reducing endwall loading to increase range. Reducing the trailing edge angle of the blades and vanes near the endwall region forces more flow through the endwalls in the repeating stage environment. This surplus of flow at design aims to lower the static pressure rise such that near stall, the static pressure rise coefficient across the span of the blade is more uniform. By doing this the full range capability of the blade is extracted and hence compressor operating range is extended.

In the present example the aerofoil portions have been described for all stages downstream of the second stage of the intermediate compressor. However, alternatively all stages or only selected stages of the compressor may have the described aerofoil portions. It will be appreciated by the person skilled in the art that the described stator vanes and rotor blades may be used in the high pressure compressor in addition to or alternatively to the intermediate compressor. In alternative embodiments the described rotor blade and stator vanes may be used in a tandem compressor, for example, the described stator vanes and/or rotor blades may be used in compressor arrangements where two rotor blades directly follow each other and said two rotor blades are followed by one or more stator vanes.

In the described examples, both the rotor blade and the stator vane have an aerofoil portion profiled in a spanwise direction such that the aerofoil portion has a trailing edge that is angled more towards the axial direction in a region proximal to the casing and in a region proximal to the hub than in a mid-region. However, in alternative embodiments only the blades or only the stator vanes may be profiled in this way. In such embodiments, the change in angle of the leading edge from the conventional angle may need to be greater than when both the blades and vanes are profiled in this way. Profiling both the stator vanes and the rotor blades achieves the previously described benefits more efficiently and robustly than profiling only the rotor blades or profiling only the stator vanes.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A multistage compressor for a gas turbine engine, the multistage compressor comprising:
   a plurality of compressor stages, each stage of the plurality of compressor stages comprising in axial flow series a row of rotor blades and a row of stator vanes;
   a hub to which a radially inner end of each rotor blade of the rows of rotor blades is connected; and
   a casing that circumscribes the rows of rotor blades and the rows of stator vanes,
   wherein an aerofoil portion of each of the rotor blades and the stator vanes of one or more stages of the plurality of compressor stages is profiled in a spanwise direction such that (i) the aerofoil portion has a trailing edge that is angled more towards an axial direction of the multistage compressor in regions of the aerofoil portion proximal to the casing and the hub than in a mid-region of the aerofoil portion and (ii) from a leading edge of the aerofoil portion to its trailing edge, the aerofoil portion has greater curvature proximal to the casing and the hub than in the mid-region.

2. The multistage compressor according to claim 1, wherein an angle between the axial direction and the trailing edge of one of the aerofoil portions increases from a position proximal to the hub or casing to the mid-region.

3. The multistage compressor according to claim 1, wherein an angle of the trailing edge in the mid-region of one of the aerofoil portions is constant.

4. The multistage compressor according to claim 1, wherein the mid-region of the aerofoil portion of one of the rotor blades has a spanwise extent between 30 and 70%, inclusive, of a span of the rotor blade.

5. The multistage compressor according to claim 1, wherein the trailing edge of one of the aerofoil portions is angled such that a difference between a flow exit angle in the regions proximal to the hub and casing and a flow exit angle in the mid-region is between 0.5 and 8 degrees, inclusive.

6. The multistage compressor according to claim 1, wherein an angle of the leading edge of one of the aerofoil portions is constant in a spanwise direction.

7. The multistage compressor according to claim 1, wherein the one or more stages of the plurality of compressor stages having the profiled aerofoil portions are positioned downstream of a second stage of the plurality of compressor stages.

8. The multistage compressor according to claim 7, wherein
   every stage of the plurality of compressor stages positioned downstream of the second stage includes profiled aerofoil portions.

9. The multistage compressor according to claim 1, wherein the trailing edge of the aerofoil portion of one of the rotor blades is angled more towards the axial direction in a region near a tip of the aerofoil than in a region near the hub to which the rotor blade is attached.

10. A gas turbine engine comprising a multistage compressor comprising:
    a plurality of compressor stages, each stage of the plurality of compressor stages comprising in axial flow series a row of rotor blades and a row of stator vanes;
    a hub to which a radially inner end of each rotor blade of the rows of rotor blades is connected; and
    a casing that circumscribes the rows of rotor blades and the rows of stator vanes,
    wherein an aerofoil portion of each of the rotor blades and the stator vanes of one or more stages of the plurality of compressor stages is profiled in a spanwise direction such that (i) the aerofoil portion has a trailing edge that is angled more towards an axial direction of the multistage compressor in regions of the aerofoil portion proximal to the casing and the hub than in a mid-region of the aerofoil portion and (ii) from a leading edge of the aerofoil portion to its trailing edge, the aerofoil portion has greater curvature proximal to the casing and the hub than in the mid-region.

* * * * *